United States Patent

Yanovsky

[11] Patent Number: 5,703,948
[45] Date of Patent: Dec. 30, 1997

[54] PROTECTED COMMUNICATION METHOD AND SYSTEM

[75] Inventor: Eli Yanovsky, Haifa, Israel

[73] Assignee: Elementrix Technologies Ltd., Haifa, Israel

[21] Appl. No.: 320,452

[22] Filed: Oct. 11, 1994

[30] Foreign Application Priority Data

Feb. 14, 1994 [IL] Israel ......................................... 108645

[51] Int. Cl.⁶ ..................................................... H04L 9/26
[52] U.S. Cl. ................................................. 380/21; 380/46
[58] Field of Search ......................................... 380/21, 46

[56] References Cited

U.S. PATENT DOCUMENTS

| | | | |
|---|---|---|---|
| 1,657,411 | 1/1928 | Scherbius . | |
| 4,405,829 | 9/1983 | Rivest et al. | 380/30 |
| 4,747,139 | 5/1988 | Taaffe | 380/46 |
| 4,799,259 | 1/1989 | Ogrodski | 380/46 |
| 4,805,216 | 2/1989 | Gruenberg | 380/21 |
| 4,817,148 | 3/1989 | Lafferty et al. | 380/46 |
| 4,864,615 | 9/1989 | Bennett et al. | 380/21 |
| 5,412,730 | 5/1995 | Jones | 380/46 |
| 5,467,398 | 11/1995 | Pierce et al. | 380/21 |

OTHER PUBLICATIONS

E. Dawson, et al., Design of a High Speed Stream Cipher, The Institution of Engineers Australia Communications Conference, Sydney, Australia, 20–22 Oct. 1992.

B.J. Pankowski, A High–Grade Data Encryption Algorithm, 1977 IEEE International Symposium on Information Theory, Ithaca, N.Y., USA, p. 42.

H. Suzuki, et al., Arithmetic Operational Algorithms for Variable–Length Data Encryption, 1986 IEEE International Symposium on Information Theory, Ann Arbor, MI. USA, 6–10 Oct. 1986, p. 119.

Primary Examiner—Salvatore Cangialosi
Attorney, Agent, or Firm—Ladas & Parry

[57] ABSTRACT

A method and apparatus for transmitting encrypted messages between two units, by initializing the two units with respect to each other, and thereafter transmitting the messages between the two units encrypted by means of dynamic random keys which are changed internally within the two units in synchronism with each other, thereby obviating the need for transferring keys or for a master key.

47 Claims, 6 Drawing Sheets

FIG. 4 FOUR ZONE PROCESS
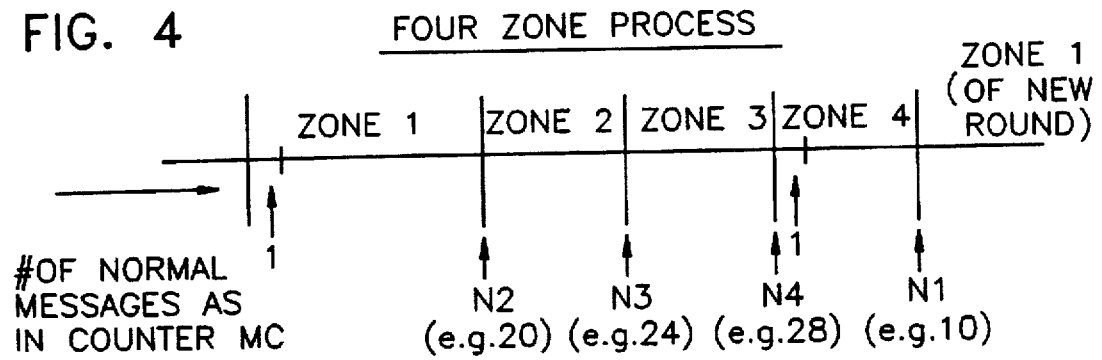
FIG. 5 TR
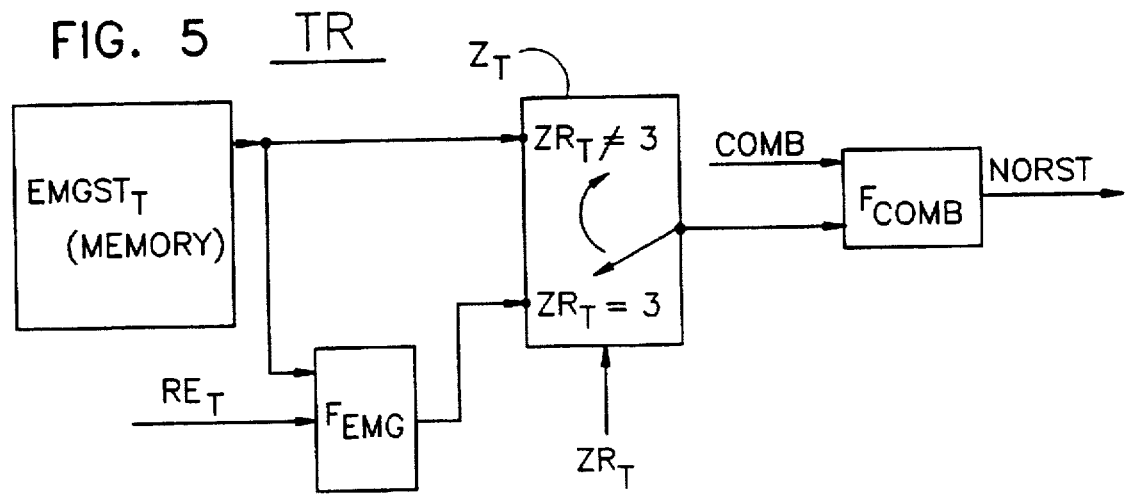
FIG. 6 REC
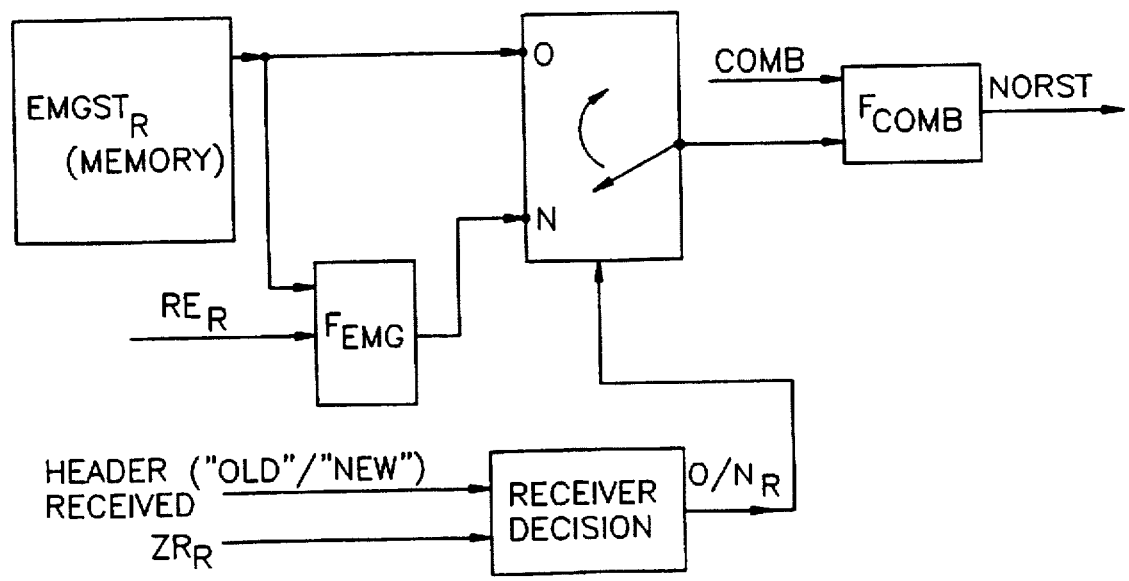

PROTECTED COMMUNICATION METHOD AND SYSTEM

FIELD AND BACKGROUND OF THE INVENTION

The present invention relates to a novel communication method and system protected by encryption. The invention is particularly useful in communication systems requiring a very high degree of protection against unauthorized decryption, and is therefore described below particularly with respect to such an application.

Modern cryptography has developed a number of encryption methods and systems in which a plaintext (X) is encrypted to a ciphertext (Y) and then decrypted back to the original plaintext (X) by the use of various encrypting algorithms (E), decrypting algorithms (D), encryption keys ($K_E$) and decryption keys ($K_D$). For digital systems, the plaintext X is a digital sequence of symbols from the binary alphabet consisting of the symbols 0 and 1 (bits). The ciphertext Y is also a digital sequence, as are the encryption key $K_E$ and decryption key $K_D$. The ciphertext Y is the output of the encryption algorithm (E) operating according to the encryption key ($K_E$) on the plaintext X; and the plaintext X is the output of the decryption algorithm (D) operating according to the decryption key ($K_D$) on the ciphertext Y. Thus, a message in plaintext X to be transmitted is encrypted to ciphertext Y, transmitted via a communication channel (wire or wireless) from the transmitter to the receiver, and is decrypted by the receiver back to the original plaintext X.

To enable the receiver to decrypt the ciphertext message Y, the decryption key ($K_D$) must obviously match the encryption key ($K_E$); and to prevent unauthorized decryption, the decryption key $K_D$ must be known only to the authorized receiver.

Many sophisticated techniques are used by eavesdroppers for decrypting messages. These techniques include: (1) cryproanalysis, e.g., finding an anti-algorithm; languages, blocks or patterns of messages, etc.; (2) brute force attack, e.g., analyzing the sequence of keys through the use of strong computers; and (3) exploiting weaknesses of human factors, e.g., taking advantage of a potential weakness in the generation, management, transfer and/or storage of the keys and information. The strength and efficiency of a cryptographic system is determined by the strength and complexity of the algorithm, the length of the key (compared to the length of the encrypted data), and the frequency with which the key is changed. However, the stronger and more complicated the algorithm, the longer the delay in activating real time communication. Long keys and/or frequent changes of keys cause a heavy load on communication lines, as well as add to the burdens of creating, managing and storing the hierachies of these keys.

The dramatic developments in computer speed and capabilities, especially in parallel computing, enable an unauthorized receiver to decrypt messages even when highly sophisticated encryption algorithms have been used. The capability of an encryption system to prevent unauthorized decryption therefore depends to a large extent on the degree the encryption keys can be kept secret. A very secure system requires a frequent change of the keys.

The best method, the ultimate one, is the one-time pad encryption method. In this method, there is a key whose length is as long as the message it is encrypting; and in order for the next message to be encrypted, a new key is created. A one-time pad encryption system is therefore impossible to break. However, one time pad encryption requires that: (1) the length of the key must be at least as long as the message being encrypted; (2) for each new message, a new key must be created which is at least as long as the new message; (3) each key must be generated randomly; and (4) both parties involved in the transmission must have the key.

For these reasons, it is not possible to use one-time pad encryption on a wide scale. Today, one-time pad encryption is restricted to cases where absolute security is essential irrespective of cost. In such cases the relevant key is generally delivered by a courier.

As modern communication becomes more and more rapid, the requirements of modern cryptography and the heavy and relatively slow algorithms act as substantial limiting factors in the attainable speed. Moreover, as communication nets become more and more open and distributed, the communication systems becomes more easily accessible to eavesdroppers, thereby increasing the already heavy burden for existing authentication and identification procedures; moreover, key management is of critical importance and difficult to achive in an economical manner.

OBJECTS AND SUMMARY OF THE INVENTION

An object of the present invention is to provide a new encrypting method and system having advantages in the above respects.

According to the present invention, there is provided a method of transmitting encrypted messages between two units, characterized in initializing the two units with respect to each other, and thereafter transmitting the messages between the two units encrypted by means of dynamic random keys, wherein the dynamic random keys are changed by using random characteristics inherent in the messages themselves, and are changed internally within the two units in synchronism with each other, and wherein the synchronism is maintained during the transmission of messages, and from one message transmission to the next, without the need for transferring keys or for a master key.

According to further features of the described embodiments of the invention, one unit, serving as the transmitter for a message, divides the message into a plurality of segments, encrypts each segment by an encrypting key which changes randomly from segment to segment, and from message to message and transmits the encrypted segments; and the other unit, serving as the receiver for the respective message, receives the encrypted message, divides the received message into the same segments as in the transmitter, and decrypts each segment by the use of a decrypting key which initially matches the encrypting key and which changes randomly from segment, and from message to message, to segment in the same manner as the encrypting key.

More particularly, according to further features in the preferred embodiment of the invention described below, the encrypting key is the output of a state machine at the transmitter, which state machine changes its state in a random manner from segment to segment, and from message to message, according to at least one random characteristic transmitted with the respective segment; and the decrypting key is the output of a state machine at the receiver, which latter state machine also changes its state in a random manner from segment to segment, and from message to message, according to the same random characteristic of the respective segment.

According to further features in the described preferred embodiment, the segments are in the form of digital data in the binary notation, and the state machines of the two units change their states according to a function of at least one random bit in the respective segment. In the described preferred embodiment, two random bits in the respective transmitted encrypted segment are used for this purpose.

According to further features in the described preferred embodiment, a function of the state of the respective state machine is used for determining the location of at least one random bit in the respective transmitted segment, and also the length of the respective transmitted segment. A plurality of redundant bits (six redundant bits in the described preferred embodiment), are interjected into each transmitted segment for error detection and correction; and a function of the state of the respective state machine is utilized also for determining the locations of the interjected redundant bit or bits in the respective transmitted segment.

According to still further features in the described preferred embodiment, the state machines of the two units are normal state machines effective during normal message transmissions to produce the random encrypting key and decrypting key; and both units are provided with an emergency state machine whose state is changed in the same random manner during the transmissions of messages. In the event of detection of a difference in the states of the normal state machines of the two units (which may be caused, for example, by excessive errors in, or interruption of, the transmission of a segment), an emergency condition is determined to have occurred, whereupon an emergency message is transmitted causing the current state of the emergency state machines of the two units to be utilized to change their normal state machines to the same new normal state.

It will thus be seen that the present invention provides a cryptographic method and system which, once initialized between any two parties, permits cryptographic communication between them by dynamic random keys which are changed internally, at both parties in the same way, with no transfer of keys and no master keys needed. The dynamic random keys utilize but a small number of random bits (being two in the preferred embodiment described below), compared to the number of bits in the segment. This small number of random bits allows a comparable small number of redundant bits to be interjected. As a consequence, the loading of the channel is minimized, thereby permitting rapid communication. Moreover, the interjection of the redundant bits (six in the preferred embodiment described below) serves not only to detect and correct errors in the random bits, but also to detect immediately any loss of synchronism between the units. When this occurs, the emergency mode is initiated to restore synchronism by the emergency state machines which are maintained in step in the same random manner during message transmissions.

Further features and advantages of the invention will be apparent from the description below.

BRIEF DESCRIPTION OF THE DRAWINGS

The invention is herein described, by way of example only, with reference to the accompanying drawings, wherein:

FIGS. 4, 5, and 6 are diagrams helpful in explaining the operation in the emergency mode;

DESCRIPTION OF A PREFERRED EMBODIMENT

Overall System

Figure 1:
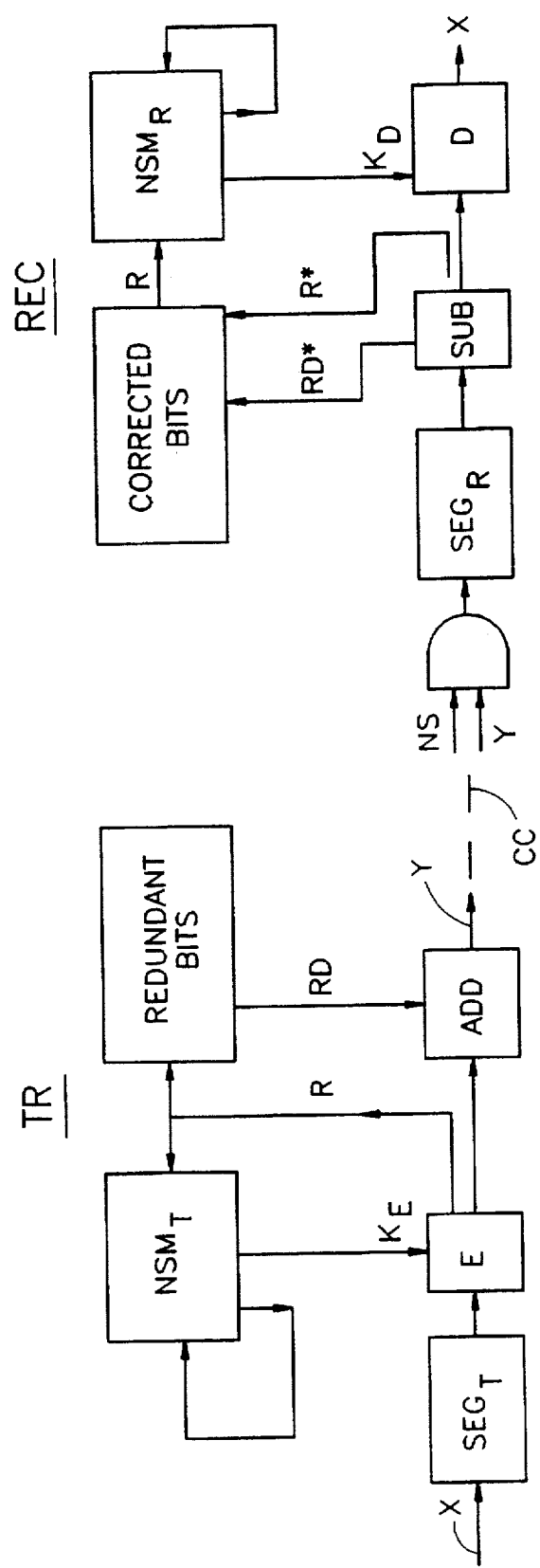
FIG. 1 is a block diagram illustrating one form of encryption system constructed in accordance with the present invention.

FIG. 1 illustrates a two-unit encrypting system in accordance with the present invention, in which a message, in the binary notation is encrypted by one unit, serving as the transmitter TR for the particular message, transmitted via a communication channel CC (e.g., telephone lines, wireless, etc.), and decrypted by the other unit serving as the receiver REC. At the transmitter TR, the plaintext message (X) is divided into a plurality of segments by a segmentizer $SEG_T$, and is encrypted by an encryption algorithm E controlled by an encryption key ($K_E$) which changes randomly from segment to segment. This produces the ciphertext Y, which is transmitted via the communication channel CC to the receiver REC. The receiver REC receives the ciphertext Y (together with transmission noise, indicated as NS), segmentizes it via its segmentizer $SEG_R$, and decrypts it by a decrypting algorithm D under the control of a decrypting key $K_D$ which also changes randomly from segment to segment to reproduce the original plaintext X.

The encryption key $K_E$ at the transmitter TR is the output of a normal state machine $NSM_T$ which changes its state in a random manner from segment to segment according to a random characteristic R transmitted with the respective segment. The decrypting key $K_D$ at the receiver REC is also the output of a normal state machine $NSM_R$ which also changes its state in a random manner from segment to segment, in the same manner as in the transmitter TR and according to the same random characteristic R transmitted with the respective segment.

In the particular example described below with reference to FIGS. 1 and 2, the segments are in the form of digital data in the binary notation, and the normal state machine $NSM_T$ at the transmitter TR changes its state in a random manner according to a function of the random bits Ri(T) in the respective transmitted segment of the ciphertext Y. At the receiver REC, the same function of the random bits Ri(R) is utilized for changing the state of its normal state machine $NSM_R$ to provide the decryption key $K_D$ which changes in the same random manner as the encryption key $K_E$, and which controls the decrypting algorithm D in order to reproduce from the ciphertext the original plaintext X.

It will thus be seen that the normal state machines $NSM_T$, $NSM_R$ at the transmitter and receiver, respectively, both change their states in the same random manner with the transmission of each segment. Each new state of the two normal state machines selects the locations of the random bits R to be used as the random characteristics in the respective transmitted segment. Thus, the encrypting and decrypting keys, once initially matching, change randomly in the same manner from segment to segment and thereby stay matching with each other.

The normal state machines in the transmitter and receiver are used not only for determining the location of the random bits in the respective transmitted segment, but are also used for determining the length of the respective transmitted segment; they are further used for determining the location of redundant bits (RD) interjected into the ciphertext Y in order to detect and correct transmission errors in the respective random bits.

In the preferred embodiment of the invention described below with respect to FIGS. 1 and 2, two random bits of the ciphertext are used for controlling the randomness of the operation of the two state machines; also, these random bits are reinforced by six interjected redundant bits, which are sufficient to correct up to two transmission errors in the random bits of the respective segment.

In the event of an excessive number of errors in the above bits, or of interruption of communication between the two parties, the two parties will quickly go out of synchronism. As described below with respect to FIGS. 3–8, this loss in synchronism is immediately detected, and is automatically restored by emergency state machines maintained in the same state and in the same random manner in both units. Thus, when non-synchronization between the two parties is detected, an emergency condition is declared in which the emergency state machines of both parties, being in the same state, are utilized for changing the normal state machines of the two parties to the same new normal state, thereby restoring synchronism between the two parties.

Figure 3:
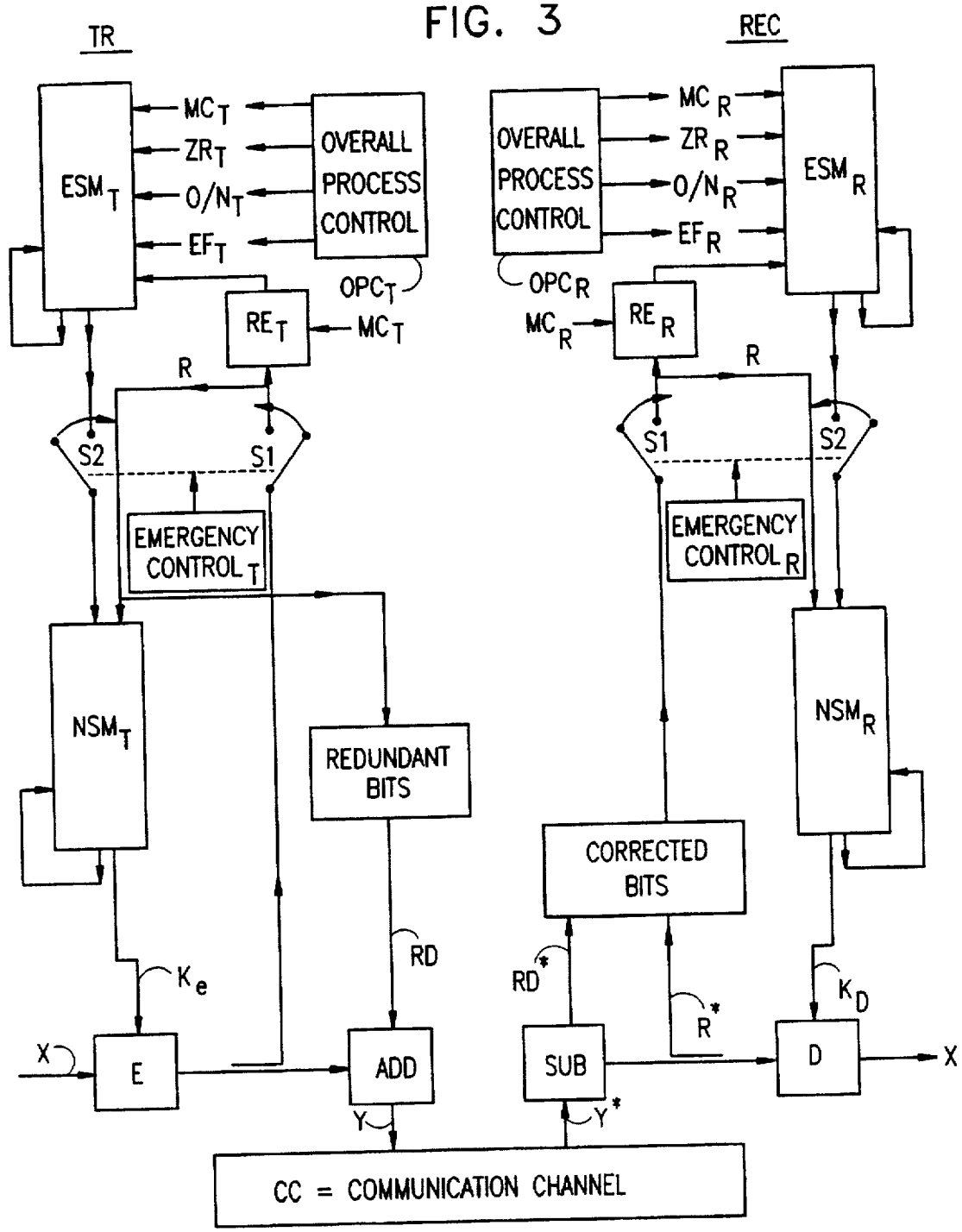
FIG. 3 is a block diagram illustrating the operation of the system of FIG. 1 during a normal mode, and the manner it is switched-over to an emergency mode in the event of loss of synchronism between the two units.

The emergency state machines at both parties (one being a transmitter and the other a receiver, as shown at $ESM_T$ and $ESM_R$, respectively, FIG. 3, for any particular message) are maintained in the same state by changing their states at the same time and in the same random manner. This is accomplished by providing each unit with a message counter $MC_T$, $MC_R$ (FIG. 3) which counts a predetermined number of messages transmitted between the two parties to define a round. After each round of messages, the system utilizes random emergency bits (RE) for creating a new state in both emergency state machines. The random emergency bits are the normal random bits Ri taken from a predetermined message, in this case the first message, in the respective round. The occurrence of an emergency condition (loss of synchronism) within a round restarts the counting of messages for the respective round.

The described system also utilizes a "fail-safe" validation process, hereinafter called the "four zone process", more particularly illustrated in FIGS. 4–8, to assure that, should an emergency condition occur in an ambiguity region within any round, the emergency state machines of both units will be in the same state for purposes of restoring synchronism in their respective normal state machines.

For this purpose, each unit includes a four-zone register, $ZR_T$, $ZR_R$ (FIG. 3). As will be described more particularly below with respect to FIGS. 4–8, zones 1 and 4 constitute non-ambiguity regions, whereas zones 2 and 3 constitute ambiguity regions.

When an emergency condition occurs, the transmitter of the respective message transmits an emergency message, rather than a normal message. Such an emergency message is prefaced by a header which declares an emergency condition and also whether the New state or the Old state of the emergency state machine is to be used; the actual state used (Old or New) is indicated by a flag ($O/N_T$, $O/N_R$ (FIG. 3).

Should an emergency condition occur in a non-ambiguity region (zones 1 or 4), each party will use the Old state when in zone 1 and the New state when in zone 4. However, should an emergency condition occur in an ambiguity region (zones 2 and 3), the receiver of the respective message will act according to the state (i.e., Old state or New state) announced by the transmitter of the respective message in its header, even though the receiver may be in a zone different from that of the transmitter. However, in zones 2 and 3, when using on the Old state, the New state can also be produced; and when using the New state, the Old state remains stored, and the New state is produced ad hoc, so that such states will be available in case the respective party has to return to the Old state or resume the New state in order to maintain synchronism. This is more particularly described below with respect to FIGS. 4–8.

The random emergency bits (RE), taken from the first message in the described preferred embodiment, are not utilized for creating a new state in the emergency state machines until a predetermined number of normal messages have been transmitted between the two parties without the occurrence of an emergency condition. This assures that both parties are operating properly in synchronism with each other before either irreversibly changes in memory the state of its respective emergency state machine.

As shown in FIG. 3, the transmitter TR and receiver REC both include an emergency-condition flag $EF_T$, $EF_R$, respectively. These flags are set (EF=1) whenever an emergency condition occurs, and are reset (EF=0) immediately after a predetermined number of normal message transmissions have taken place. As will be described more particularly below, this flag is used in the "four-zone" validation process to assure that the emergency state machines of the two parties will be in the same state for purposes of restoring synchronism in their respective normal state machines.

Prior to the communication of a message, the two parties may engage in various "handshake" processes, and the end of a communication may be accompanied by various types of "acknowledgment processes".

Normal State Operation

Figure 2:
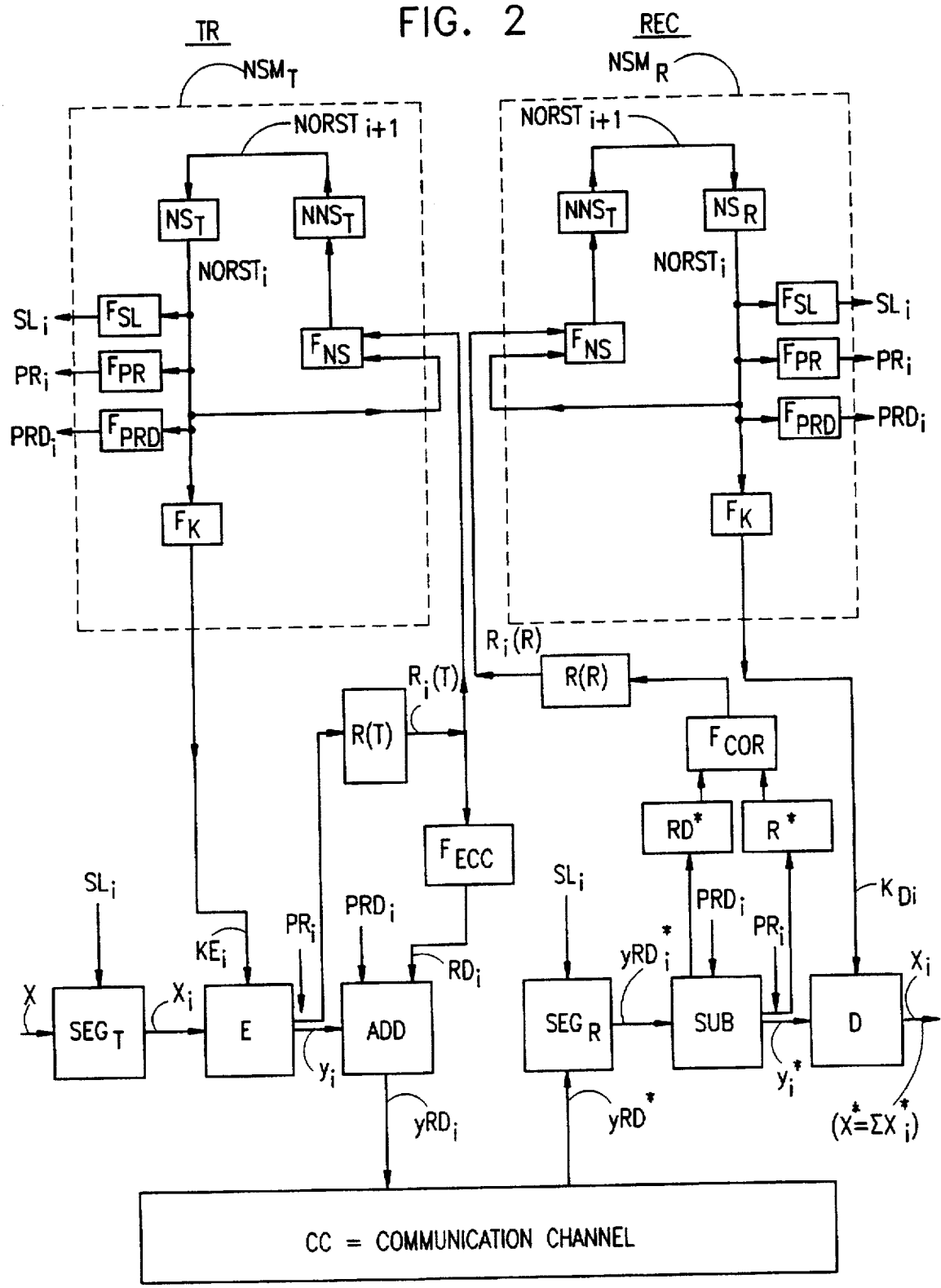
FIG. 2 is a block diagram more particularly illustrating the operation of the normal state machines in the system of FIG. 1.

As shown generally in FIG. 1 and more particularly in FIG. 2, the transmitter TR includes a segmentizer $SEG_T$ which divides the original plaintext X into a plurality of segments Xi. Each segment Xi has its parameters and variables; for example, each segment Xi is a sequence of plaintext bits of length SLi, inputted into an encrypting algorithm block E. The latter block also receives as a second input an encrypting key $K_{Ei}$ supplied from a normal state machine $NSM_T$, via a function block $f_K$.

The encrypting key KEi is determined by the state of the normal state machine $NSM_T$. FIG. 2 illustrates this machine as having two memories, namely a normal state memory $NS_T$ and a new normal state memory $NNS_T$. The state of this machine changes in a random manner to be described below, and therefore the encrypting key, determined by the state of the normal state machine $NSM_T$, also changes in a random manner.

Thus, the normal state machine $NSM_T$ changes in a random manner from segment to segment according to one, or a few, random bits Ri(T) of the respective segment. If more than one random bit is used for this purpose, the number should be relatively few compared to the number of bits in the respective segment so as not to overload the system. Particularly goods results have been produced when only two random bits Ri were used for this purpose.

The two random bits Ri are coupled from the encrypted segment Yi outputted from the encryption block E, and are fed via a random bits block R(T) into the new state function block $f_{NS}$ which produces the new normal state that occupies memory $NNS_T$ of the normal state machine $NSM_T$. The new state function block $f_{NS}$ also receives, as another input, the output of the normal state memory $NS_T$ of the normal state machine $NSM_T$, such that the two inputs to block $f_{NS}$ produces a new normal state NORSTi+1. This is applied to the new normal state memory $NNS_T$. In the next segment, this becomes the current normal state and is moved to memory $NS_T$. This in turn produces a new encrypting key $K_E i+1$ applied to the encryption block E for encrypting the next segment.

The output NORSTi of the normal state memory $NS_T$ determines the locations (PRi) of the random bits in the encrypted segment Yi whose values are used to control the state machine to produce the new state, and thereby the new key for the respective segment. This is schematically shown in FIG. 2 wherein it is seen that the output NORSTi is applied to a function block $F_{PR}$ which produces the output PRi. The output PRi is in turn applied to the output of the encrypting algorithm block E to couple the random bits from the ciphertext at the locations specified by PRi. The contents of the ciphertext bits at these locations are used as the random input to determine the new state of the normal state machine $NSM_T$.

Block R(T) samples the random bits Ri(T) which are utilized in changing the state of the normal state machine $NSM_T$ via the function block $f_{NS}$. The output of block R(T) is also applied to another function block $f_{ECC}$ which produces a series of what are called "redundant bits" RDi, to be distinguished from the "random bits" Ri. The redundant bits RDi are interjected by block ADD into the encrypted segment Yi for purposes of detecting and correcting any errors in those bits resulting from noise (NS, FIG. 1) in the transmission of the respective segment via the communication channel CC.

As a preferred example, two random bits (R) could be used for determining the new state of the normal state machine $NSM_T$, and six redundant bits (RD) could be interjected into the encrypted segment Yi before transmission in order to detect and correct transmission errors. In such case, up to two transmission errors can be detected and corrected using known code correction techniques.

In the example illustrated in FIG. 2, each current normal state NORSTi not only determines the location of the two random bits to be used in the respective segment, but also determines the location of the six redundant bits to be injected into the respective segment, and further, the length of the respective segment. Thus as described earlier, the output NORSTi of the current normal state memory $NS_T$ is applied to function block $f_{PR}$ producing the output PRi which is used in determining, from the output $y_i$ of the encrypting algorithm block E, the location of the two random bits of the resepective segment. The output NORSTi, however, is also applied both to the function block $f_{PRD}$, which produces an output PRDi applied to the ADD block to determine the location for interjecting the six redundant bits, and also to function block $f_{SL}$, which produces an output SLi applied to the segmentizer $SEG_T$ for determining the length of the respective segment.

It will be appreciated that in the above-described example, that the random parameter used in producing the state of the normal state machine $NSM_T$, and thereby in producing the encrypting key KEi, is only the two random bits Ri in the respective segment; that is, the new state $NORST_{i+1}$ is determined by a function of the Old state NORSTi plus the random bits Ri of the respective segment. These random bits Ri are taken from the transmitted segment Yi and are not known in advance.

On the other hand, the length of the segment SLi, and the locations of the random bits PRi, and of the redundant bits PRDi, are all functions of the Old state NORSTi of the normal state machine $NSM_T$. Since eavesdroppers do not know the current state NORSTi of the normal state machine $NSM_T$, the inclusion of these parameters provide additional protection against decryption.

Each of the function blocks $f_{NS}$, $f_K$, $f_{SL}$, $f_{PR}$ and $f_{PRD}$ may involve relatively simple functions or complex functions, depending on the level of security desired. They should be one-way function blocks, i.e., producing predeterminable outputs from known inputs, but not permitting the inputs to be determined from the outputs. For a very high level of protection, all three of the above-describe variable parameters, SLi, PRi, PRDi, may be used as determined by the output of the normal state machine NSMT, but it will be appreciated that where lower degrees of protection are adequate, only one or two of the above-described variable parameters could be used.

The encrypting algorithm of block E can be any of the known encrypting algorithms. However, since the random nature of the encrypting key provides an exceptionally high degree of security against unauthorized decryption, a relatively simple encrypting algorithm may be used. Particularly good results have been obtained using the well known Exclusive-Or encrypting algorithm since it does not unduly load the system.

The receiver REC includes the same normal state machine $NSM_R$ having the same current and new normal state memories $NS_R$, $NNS_R$, and function blocks as in the transmitter TR. Thus, the receiver receives, via the communication channel CC, the ciphertext message YRD* outputted from the transmitter TR plus transmission noise, indicated as NS in FIG. 1. This is segmented in segmentizer $SEG_R$ under the control of the segment-length of parameters SLi. The output YRDi* is applied to circuit SUB which removes the interjected redundant bits RDi* bits, as indicated by block RD*. These redundant bits RDi* are applied to function block $f_{COR}$. Also applied to function block $f_{COR}$ are the random bits, indicated by block R*, coupled from the output of block SUB. Function block $f_{COR}$ is a correction function applied to these two inputs which gives corrected random bits Ri(R). This function is applied via a buffer R(R) to the new function block $f_{NS}$.

The current state NORSTi of the normal state machine $NSM_R$ in the receiver REC stored in memory $NS_R$ is also applied as an input to the function block $f_{NS}$. Function block $f_{NS}$ produces, from these two inputs, an output applied to the new normal state memory $NNS_R$ to produce a new state NORSTi+1. In the new segment, this will be current normal state memory $NS_R$.

The new state of the normal state machine $NSM_R$ will be fed to function block $f_K$, which will produce the decryption key $K_{Di+1}$ for the respective new segment. The latter key is applied to the decryption block D, together with the ciphertext for the respective new segment $Yi*_{+1}$, to produce the plaintext $X_{i+1}$ for the respective new segment.

It will thus be seen that once two units are initialized between any two parties, cryptographic communication may be conducted between the two parties by means of dynamic random keys produced by the outputs of normal state machines at both parties, which are changed internally at the same time in both parties. The system thus does not depend on the transfer of keys, nor on the existence of a master key.

Each unit would have a normal state memory for each party that unit may wish to communicate with, either as a transmitter or as a receiver. Thus, one party may serve as a transmitter for one message, and a receiver for another message. If a unit wishes to communicate with a number of other parties, the unit would include a normal state memory for each such other party, and the two normal state memories for each pair of such parties would change their states at the same time and in the same manner to produce random states, and thereby keys as described above.

Cryptographic communication may thus be carried out between each pair of parties by the above-described dynamically-changing random keys so long as the normal state machines of the two parties are synchronized with each other. However, there could be instances where one party loses synchronism with respect to another party. Should this occur, the system enters an Emergency Condition to restore synchronism.

Emergency Condition Operation

The Emergency Condition Operation is produced whenever the two parties are not cryptographically synchronized. This can occur when a greater number of errors is found to be present in the received segment than the error-correction code, utilizing the interjected redundant bits (RD), can correct; in the example described above wherein there are two random (R) bits and six interjected redundant bits (RD), the error-correction code can correct up to two errors in the transmitted random and redundant bits. The Emergency Condition can also occur when there is an interruption in the transmission between the two parties.

For purposes of restoring synchronization in the event of a loss of synchronization, each party includes an emergency state machine $ESM_T$, $ESM_R$, respectively. During normal message transmissions, the states of both emergency state machines are changed in the same random manner. However, in the event an emergency condition is determined to have occurred, the next transmission is an emergency message in which the state of the emergency state machines $ESM_T$ and $ESM_R$, of the transmitter and receiver for the respective transmission are utilized for changing the normal state machines $NSM_T$, $NSM_R$ to the same new normal state.

Each emergency state machine is changed in the same random manner during the normal state operation by counting a predetermined number of normal message transmissions between the two parties to define a round of messages; and after each round of messages, utilizing random emergency bits RE, for creating a new state in the emergency state machines in both parties. Thus, should an emergency condition (non-synchronization) occur, the states of the two emergency state machines are used as a seed to produce the same new normal state in the normal state machines of the two parties, thereby restoring synchronization.

The foregoing operation is schematically shown in FIG. 3, wherein it will be seen that in the normal transmission mode, switch S1 is closed, and switch S2 is open. In this mode as described earlier, each segment of the plaintext is encrypted by the encrypting algorithm E according to the encrypting key $K_{Ei}$ randomly outputted by the normal state machine $NSM_T$ for the respective segment. As also described earlier, the two random bits (R) are the random parameters for determining the new state NORST+i of the normal state machines $NSM_T$, $NSM_R$; the New normal states determine not only the locations of the two random bits (PRi) of the respective segment and of the six redundant bits (PRDi) to be interjected into the respective segment, but also the length (SLi) of the respective segment.

During the normal state operation, the emergency state machines $ESM_T$ and $ESM_R$ in the units of both parties are actuated in the same random manner by the emergency bits (RE), so that they both occupy the same state in a standby condition. Upon the loss of synchronization between the two parties, an emergency condition is declared, which automatically actuates the system to an emergency mode by the opening of switch S1 and the closing of switch S2. When this occurs, the states of the two emergency state machines ($ESM_T$ and $ESM_R$), are used for actuating the respective normal state machines $NSM_T$ and $NSM_R$ to the same normal state, to thereby restore synchronization between the transmitter and receiver of the respective transmission.

It is critical that the emergency state machines $ESM_T$ and $ESM_R$ in both parties be actuated in the same random manner to the same states to assure that they will produce the same normal states in the respective normal state machines upon the occurrence of an emergency condition. The actuation of the emergency state machines of both parties is not at the same fast rate as the actuation of the normal state machines. Thus, whereas the normal state machines are actuated once for each segment, the emergency state machines are normally actuated once for each round, one round including a plurality of messages (28 in the example described below), with each message including a plurality of segments (depending on the length of the message).

For purposes of actuating the emergency state machines in both parties at the same time and in the same manner, both include a message counter ($MC_T$ and $MC_R$, respectively) which count a predetermined number of message transmissions to define a round. Each emergency state machine is actuated at the end of a round.

However, there is a possibility that two parties in a communication system may not be exactly at the same count in their respective message counters MC. For example, one party may have registered a count for transmitting a message to the other party of the pair, but the other party of the pair may not have actually received the message and therefore did not register the count; or, one party may have received a message not sent by the othrer pary of the pair and may therefore have mistakenly registered a count which was not registered by the other party. Therefore, one side may have crossed the changeover point for actuating the emergency state machine to a new state, whereas the other side may not have reached the changeover point, and therefore its emergency state machine may still be at the old state.

Accordingly, there is an ambiguity region towards the end of a round where the two sides may not be in step. If at such a time an emergency condition should arise and the two emergency state machines are not in step, the normal state machines of the two sides will not be actuated to the same state, and therefore re-synchronism will not be attained.

To avoid this possibility in the ambiguity region, special precautions are taken wherein the two parties perform a "fail-safe" validation process before their respective emergency state machines are considered as having been activated to the new state, for purposes of activating their respective normal state machines to the new state to restore synchronism. This validation process is hereinafter called the "four-zone process". It utilizes not only the previously-mentioned message counters $MC_T$, $MC_R$ and the zone registers $ZR_T$, $ZR_R$ as illustrated in FIG. 3, but also an Old/New flag $O/N_T$, $O/N_R$ and an Emergency Condition flag $EF_T$, $EF_R$, all controlled by an overall process control block $OPC_T$, $OPC_R$.

The "Four-Zone" Validation Process

According to the "four-zone" validation process as illustrated in FIG. 4, each round of a predetermined number of normal messages (28 in the example described below) is divided into three zones, there being a fourth zone constituted of the first part of the subsequent round. The zone of the respective side is registered in its zone register $ZR_T$, $ZR_R$, respectively. Thus, the zone register of each side registers zone=1 at the beginning of the round, zone=2 at message number $N_2$ (e.g., $N_2$=20), zone=3 at message number $N_3$ (e.g., $N_3$=24), and zone=4 at message number $N_4$ (e.g., $N_4$=28). Zone 4 covers the first N1 (e.g., N1=10) messages of the next round.

When 28 normal messages have thus been transmitted in the respective round, the message counters $MC_T$, $MC_R$ (FIG. 3), which have been counting the messages in the respective round, actuate their respective emergency state machine $ESM_T$, $ESM_R$ to a new state, whereupon the counters of the two parties are reset to "0" to begin the next round. An emergency condition also automatically resets the message counters of the two parties to zero to start a new round. However, as will be described more particularly below, the zone of the respective party, as indicated by zone registers, $ZR_T$, $ZR_R$, respectively, is not reset or otherwise changed immediately by the emergency condition.

The emergency random bits RE which are used by both parties for actuating the respective emergency state machine at the end of the round are derived from the normal random bits Ri and are coupled from the first message in the round. However, the emergency random bits RE are not used for actuating the respective emergency state machine until the end of zone 1, that is at message number $N_2$ of the respective round. $N_2$ is a relatively large number ($N_2$=20 in the illustrated examaple) to assure that the emergency random bits RE are correct before they are actually used to randomly actuate the emergency state machine $ESM_T$, $ESM_R$. Thus, if they were incorrect, the two sides would lose normal synchronization before they reached message number 20 because bits RE are derived from bits Ri; loss of synchronism activates the emergency condition which, as described above, resets the counters and restarts a new round. Absolute certainty is thus assured that these random bits RE are correct if the round continues until message number 20.

The new emergency state (NEW EMGST) is produced by the random bits RE of the respective round upon entering zone 4, i.e., upon completing $N_4$ messages (in this case 28) of the respective round. The new emergency state NEW EMGST replaces the old one in the memory.

As will also be described more particularly below, each message transmitted is preceded by a header containing various types of information, e.g., the identification of the transmitter and the receiver, and whether the transmission is in the Normal Mode in which a normal message is transmitted, or in the Emergency Mode in which an emergency condition is actuated to re-establish synchronism.

If the transmission is in the Emergency Mode, the header includes a combination number (COMB, FIG. 5) and also an announcement "Old" or "New"; that is, whether the transmitter is using the "Old" emergency state, or the "New" emergency state. The latter information, together with the zone number in its respective zone register ($ZR_R$) is used by the receiver in determining whether the receiver uses the "New" state or the "Old" state of its emergency state machine $ESM_R$ for actuating its normal state machine $NSM_R$ to re-establish synchronism with the transmitter. Its flag $O/N_T$, $O/N_R$ registers whether it has used the Old state, or the New state, of its emergency state machine $ESM_T$, $ESM_R$ to actuate its respective normal state machine $NSM_T$, $NSM_R$.

Zones 2 and 3 (e.g., of four normal messages each) represent an ambiguity region near the end of a 28-message round wherein, if an emergency conditon occurs, it may be that the two parties are not in the same zone for reasons set forth earlier. To make sure both sides actuate their respective normal state machines to the same state particularly in this ambiguity region (zones 2 and 3), the following procedure is followed upon the transmission of an emergency message following the occurrence of an emergency condiion:

1. If the emergency message transmission occurs in zone 1 of the respective round, the transmitter in zone 1 uses the Old emergency state (which is in its memory) to actuate its normal state machines $NSM_T$, announces "OLD" in its header, and registers this ("O") in its flag $O/N_T$. The receiver in zone 1 uses the Old emergency state (which is in its memory) to actuate its normal state machines $NSM_R$, registers this ("O") in its flag $O/N_R$, and ignores the announcement.

2. If the emergency message transmission occurs in zone 2 of the respective round, the transmitter in zone 2 also uses the Old emergency state and announces "OLD" in the header. The receiver in zone 2 uses the emergency state according to the announcement received by it. That is, if the receiver received "OLD" (indicating the transmitter was in zone 1 or 2), the receiver uses the Old emergency state; and if it received "NEW" (indicating the transmitter was in zone 3), the receiver produces the New emergency state by the emergency random bits (RE) to restart its normal state machine, and holds its new emergency state temporarily (ad hoc), but does not yet actuate in memory its emergency state machine to the new emergency state.

3. If the emergency message transmission occurs in zone 3 of the respective round, the transmitter in zone 3 uses the new emergency state produced ad hoc, but does not yet actuate its memory to the new emergency state; the transmitter also announces "NEW" in the header. The receiver in zone 3 uses the emergency state according to the announcement, the same as in zone 2.

4. If the emergency message transmission occurs in zone 4, the transmitter in zone 4 uses the New emergency state, which is already in its memory, and announces "NEW" in the header. The receiver in zone 4 uses the New emergency state, which is already in its memory, and ignores the announcement.

The following table summarizes the foregoing operations:

TABLE 1

| EMGST IN ZR MEMORY | TRANSMITTER USES | AN- NOUNCES | RECEIVER ANNOUNCE- MENT RECEIVED | USES |
|---|---|---|---|---|
| 1 Old | Old | "Old" | No Matter | Old |
| 2 Old | Old | "Old" | "Old" | Old |
|  |  |  | "New" | New (Ad Hoc) |
| 3 Old | New (Ad Hoc) | "New" | "Old" | Old |
|  |  |  | "New" | New (Ad Hoc) |
| 4 New | New | "New" | No Matter | New |

It will thus be seen that the receiver follows the transmitter announcement in the ambiguity regions of zones 2 and 3. However, if the transmitter is in zone 3, it acts according to the New state of the emergency state machine but retains the Old state in its memory. The receiver, when in either zone 2 or zone 3 and using the New state, also retains the Old state in its memory. The purpose of thus retaining the Old state in the memory is to enable the two parties to revert back to the Old state if necessary, e.g., if another emergency condition occurs immediately, and the last receiver becomes the transmitter for this message and uses the Old emergency state according to its zone.

The emergency condition flags $EF_T$, $EF_R$ provided in both parties indicate whether there was an emergency condition. As soon as an emergency condition occurs, this flag is set (EF=1); and when the parties restart communicating normal messages, the flag is reset (EF=0) immediately after a predetermined number of normal messages have been transmitted (eight in the example described below).

As indicated earlier, the message counters $MC_T$, $MC_R$ are automatically returned to zero upon the occurence of an emergency condition; however, the zone registers $ZR_T$, $ZR_R$ are not changed immediately. The following table illustrates what occurs after an emergency condition has occurred (EF=1).

TABLE 2

| ZR | EF | EMGST USED | NORMAL MESSAGES COUNTED | DO |
|---|---|---|---|---|
| 1 | 1 | No Matter | M2 | EF = 0 |
|   |   |   | ELSE | Nothing |
| 2 | 1 | Old | M2 | ZR = 1, EF = 0 |
|   |   |   | ELSE | Nothing |
|   |   | New | M1 | ZR = 3 |
|   |   |   | ELSE | Nothing |
| 3 | 1 | Old | M1 | ZR = 2 |
|   |   |   | ELSE | Nothing |
|   |   | New | M2 | ZR = 4, EF = 0, and Change in Memory to NEW EMGST |
|   |   |   | ELSE | Nothing |
| 4 | 1 | No Matter | M2 | EF = 0 |
|   |   |   | ELSE | Nothing |

Thus, if the emergency condition occurs when the respective party is in zone 1 (ZR=1), the number of normal messages is counted and when this number reaches $M_2$ (e.g., eight), its flag EF is reset (EF=0); on the other hand, if another emergency condition occurs before reaching $M_2$ normal messages, flag EF remains set (EF=1), the respective zone register remains in zone 1, and the counter restarts at "0".

If the emergency condition occurs in zone 2 and the Old emergency state was used, again the $M_2$ number of normal messages are counted, whereupon the zone register returns to zone 1 (ZR=1), and the EF flag is reset (EF=0); however, if the normal messages do not reach the number $M_2$, the zone register remains in zone 2 (ZR=2), and the EF flag remains set (EC=1). On the other hand, if the New emergency state had been used, the normal messages are counted, and when it reaches $M_1$ (e.g., four), the zone register is advanced one zone (ZR=3); but if upon the resumption of normal transmission the number of normal messages does not reach $M_1$ (four), the zone register remains in zone 2 (ZR=2) and the flag EF remains set (EF=1).

If the emergency condition occurs in zone 3, and the Old emergency state was used, when $M_1$ (four) normal messages are counted the zone register is returned to zone 2 (ZR=2); but if $M_1$ normal messages are not reached, the party remains in zone 3 (ZR=3), and EF=1. On the other hand, if the New state had been used in the emergency condition, $M_2$ (e.g., eight) normal messages are counted, whereupon the zone register is advanced to zone 4 (ZR=4), flag EF is reset to zero (EF=0), the state of the emergency state machine is changed to New state in memory, and the Old state is erased. If the system does not receive $M_2$ normal messages, it remains as before.

If the emergency occurs while the party is in zone 4, as soon as $M_2$ (e.g., eight) normal messages are counted, flag EF is reset to zero (EF=0); if $M_2$ normal messages are not reached EF=1, but in any case the zone register remains in zone 4 (ZR=4).

The foregoing operations, as summarized in Table 2 above, assure that if an emergency condition occurs in the ambiguity region (zones 2 and 3), and the New state was used to restore synchronism, and the system is operating properly for a predetermined number ($M_2$) of normal messages, then the Old state can be irreversibly erased; but if $M_2$ normal messages are not reached before another emergency condition occurs, both parties can use either the Old state or the New state. In either case, the normal state machines of the two sides will be actuated to the same normal state, thereby re-establishing synchronism.

It will thus be seen that the emergency state machines in both parties will be changed in step in the same random manner so that, upon the occurrence of an emergency condition, they can be used for actuating their respective normal state machines to the same normal state in order to restore synchronism and to enable normal transmissions to be resumed.

FIGS. 5 and 6 show how the state of the emergency state machine in each side is used as a "seed" for actuating the respective normal state machines to restore synchronism upon the occurrence of an emergency condition.

Thus, in the transmitter TR (FIG. 5), the emergency state $EMGST_T$ of its emergency state machine $ESM_T$ is applied as one input to a function block $f_{EMG}$ which receives also the emergency bits $RE_T$. As described earlier, these bits were derived from the first message of the round but are stored for a predetermined number of at least $N_2$ normal message transmissions before optionally used. The output of block $f_{EMG}$ is used, via the decision block $Z_T$ and a combination function block $f_{COMB}$, to produce the New normal state NORST of its normal state machine $NSM_T$. The decision block $Z_T$ schematically shows that the Old emergency state $EMGST_T$ will be used for determining the New state NORST when the transmitter is not in zone 3, but will use the New emergency state when the transmitter is in zone 3, according to the four-zone validation process as described above.

The function block $f_{COMB}$ is included in this operation so that, in case two emergency conditions appear in quick succession, the normal state machine will not be actuated to the same normal state NORST, but to different normal states. Thus, the function block $f_{COMB}$ receives a combination COMB, which may be a simple number pre-agreed between the parties, in addition to the Emergency state (i.e., the New state or Old state) from the decision block $Z_T$, to produce the New normal state NORST.

FIG. 6 illustrates the similar operation in the receiver REC. In this case, however, the receiver follows the Old Emergency state (OLD EMGST) or New Emergency state (NEW EMGST) as appearing in the header of the emergency message transmitted by the transmitter, when in the ambiguity region of zones 2 or 3, as described above. The $f_{EMG}$ fuction creates new EMGST as output, while the inputs are: OLD EMGST and the random emergency bits, RE.

Overall Operation

Figure 7:
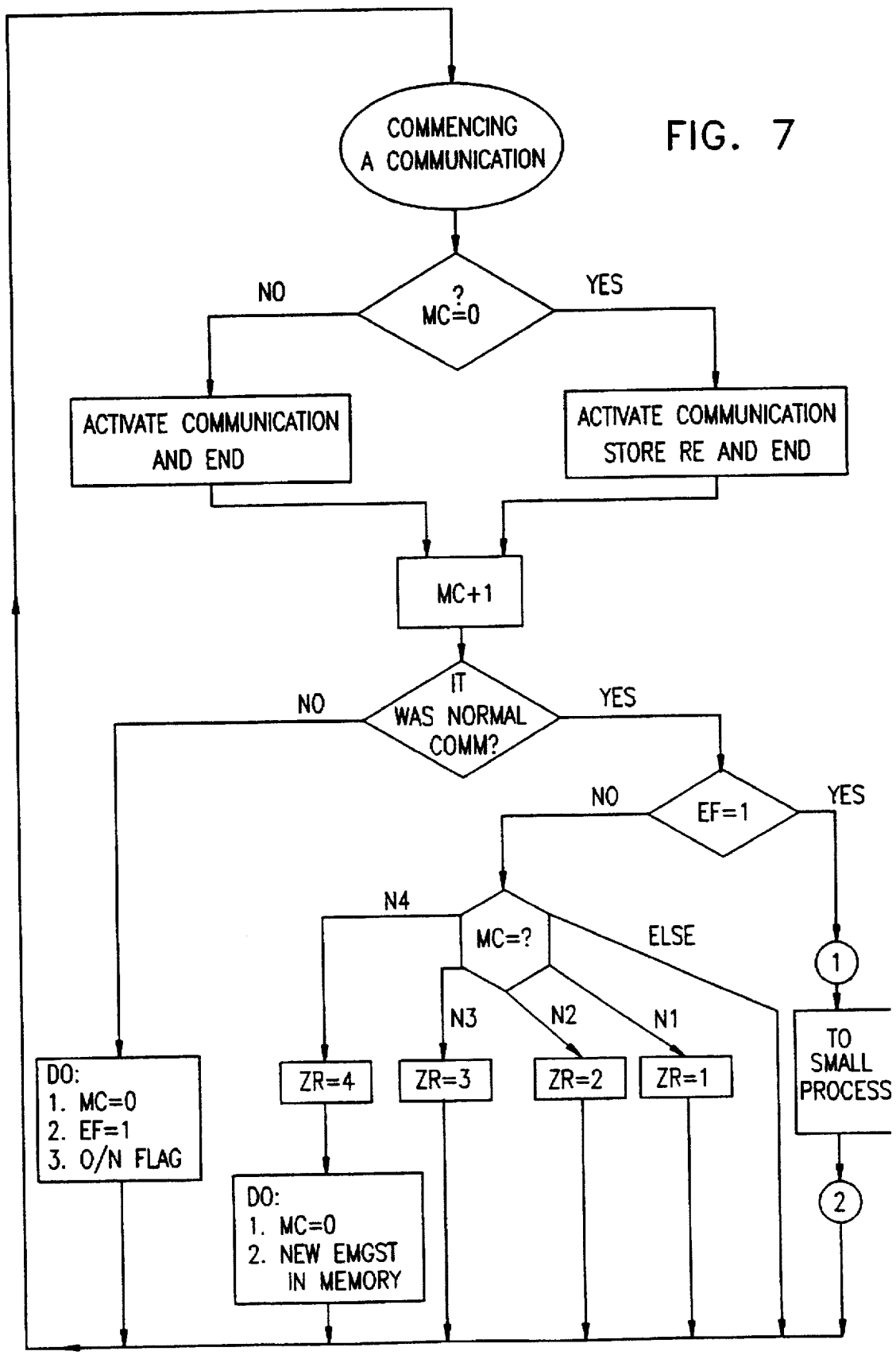
FIG. 7 is a flow chart illustrating the overall operation of the system.
Figure 8:
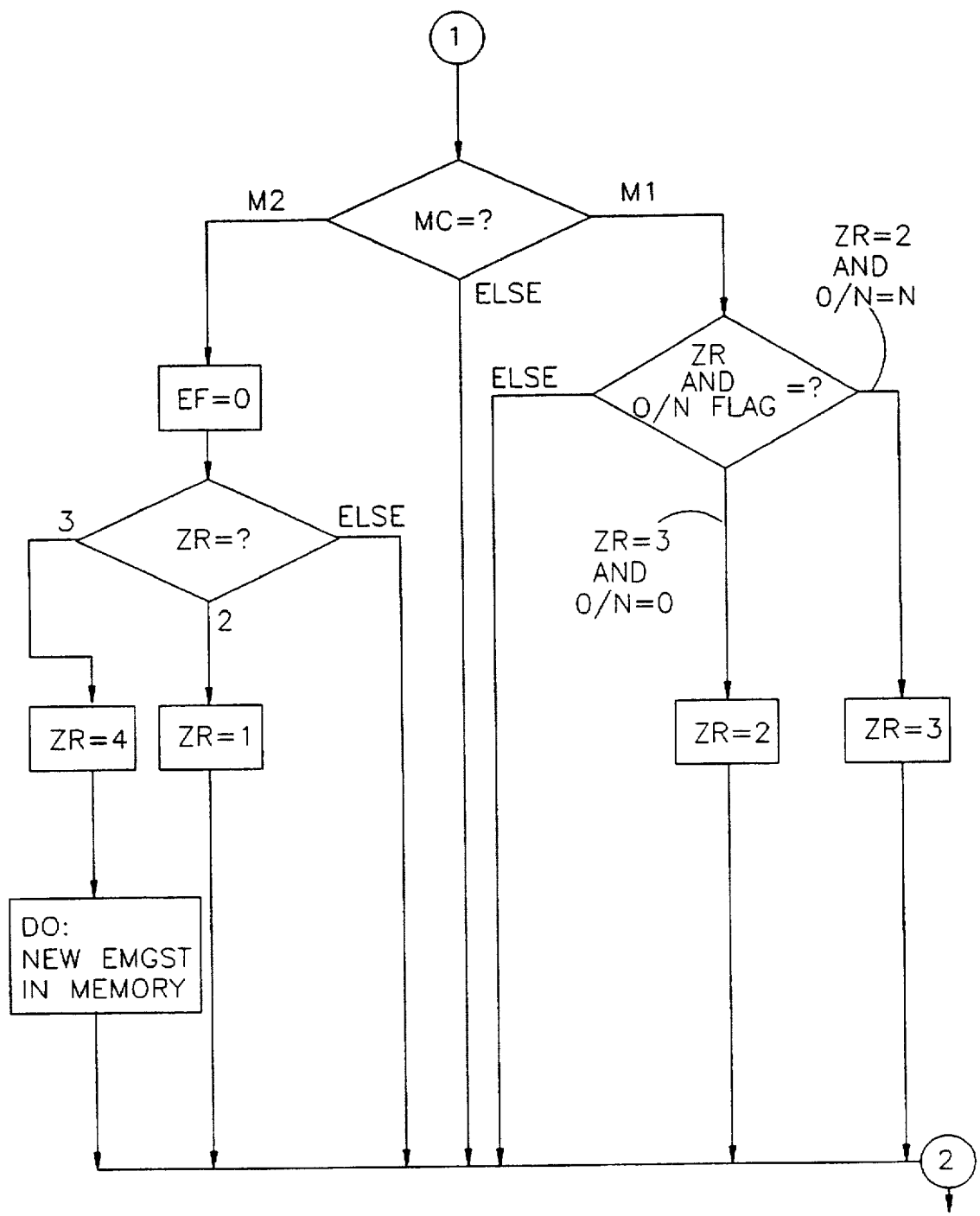
FIG. 8 is a flow chart illustrating the operation of a "small process" involved right after the emergency mode.

The overall operation of the system is illustrated in the flow charts of FIGS. 7 and 8.

Thus, FIG. 7 illustrates the starting of the communication process. Each transmitted message is preceded by a header in which the transmitter provides various types of information, including the identification of the transmitter and the receiver, whether the transmission is in the New or Old emergency state, the combination number (COMB), etc. If the transmitted message is the first of the round (message counter MC=0), the communication channel is activated and the emergency random bits (RE) are stored from this first message (MC=0). On the other hand, if the message counter was not zero, the communication channel is activated, the emergency random bits (RE) are not stored, as they had presumably been stored in a previous message.

If the transmission began not as a normal message, but as an emergency one, the message counter MC is returned to zero, and the emergency flag EF is set (EF=1). Also, the memory records whether the Old or New state of the emergency state machine was used and sets the O/N flag accordingly.

On the other hand, if the message transmitted began as a normal one, a check is made to determine whether the emergency flag EF is in its set condition (EF=1), indicating that an emergency condition had previously occured less than $M_2$ (e.g., eight) previous normal messages.

If EF flag is not in its set condion (EF=0), a check is made as to the status of the respective message counter $MC_T$, $MC_R$. If the respective counter shows the number $N_1$ (e.g., ten messages), its zone register ZR is actuated to register zone 1; if $N_2$ (e.g., 20) messages have been counted, its zone register ZR is actuated to register zone 2; if $N_3$ (e.g., 24) messges have been counted, its zone register is actuated to register zone 3; and if $N_4$ (e.g., 28) messages have been counted, its zone register is actuated to register zone 4. In addition, the message counter MC is returned to zero and a new round started; also, its emergency state machine is actuated to the New state in memory.

On the other hand, if the emergency flag EF is in its set condition (EF=1), indicating that an emergency condition had occurred less than $M_2$ (e.g., eight) previous normal messages, the system follows the operations of the flow chart illustrated in FIG. 8. The operations illustrated in FIG. 8 in such case are described above and are summarized in Table 2. These operations, as described above, assure that if an emergency condition occurs in the ambiguity region (zones 2 or 3), and a New state of the emergency state machine was used to restore synchronism, the system must operate properly for a predetermined number ($M_2$) of messages before the Old state is erased; thus, if not operating properly (i.e., a second emergency condition occurs before reaching $M_2$ number of messages), both parties will stay in zones where they can restore synchronism as described above.

TRANSMISSION PROTOCOLS

Beginning of Communication

The operation of the system may be according to a number of protocols, subject to agreement between the two parties, particularly at the beginning stage prior to the communication of a message. For purposes of example, described below are several options which may be used particularly at the beginning stage:

A. "Strong Handshake" Process

In this process the transmitter, prior to activating data communication, transmits a Header to the receiver, which informs it: "I am transmitting to you in a Normal State", as in its mind (self control) they are in synchronization. Or: "I am transmitting to you in an Emergency State, old or new, and in what combination (comb)" because in its mind they are out of synchronization.

In addition, the transmitter adds a special pad, which is a function of the NORST that is going to begin communication. This pad is not part of NORST, but is created by a One Way Function from NORST. Thus, one cannot obtain NORST by using the pad.

The receiver checks to see that there is a match according to both its mind (self control) and the pad and then reacts (and gives his "handshake"). If it is okay, it transmits back to the transmitter: "okay", and adds the same plain information it received ("Normal" or "Emergency Old/New, and Comb"). Additionally, it adds its pad (different from the pad of the transmitter), which is also a function of the NORST (a different function than that previously mentioned) that will begin communication. This is also a one way function.

If it is not "okay" (for example the transmitter wants to begin with a "Normal" state but the receiver knows, in accordance with its own control, that they are not in synchronization), then it can compel the transmitter to switch to an "Emergency" state and to transmit according to this mode, (with additional options to react) and then the process will begin again. In the "strong handshake" process, both parties are able to synchronize and determine that they are synchronized by checking the pads. As long as they are synchronized, they can be fully confident that the other party is a legitimate user, as only a legitimate user can give a one time use of such a pad.

B. Weaker Handshake Process

The same as in option A but without the use of pads.

C. Header Only, No "Handshake"

The transmitter decides which header to use and then transmits this header to the receiver: "NORMAL", or "EMERGENCY, OLD/NEW ,COMB". If a pad is added to the header, this option will be strong. If no pad is added, the option is weaker. At this time the receiver does not transmit anything in return, but in general, it understands and reacts according to what was received in the header.

D. Process With No Header At All

In this option the transmitter transmits data as desired. In the event of an "Emergency", the combinations (comb) will be in a sequential manner. Each time an emergency occurs, the comb is one number greater (or as agreed upon prior) than the last comb used (in a cyclical manner). Thus, the receiver can receive based upon its own mind, and can perform sequential trials until it successfully deciphers that "this trial is the good one".

End of Communication

The protocol may include a number of acknowledgement options at the end of a communication. Following are some examples:

A. Strong Acknowledgment Process

At the end of the communication process the transmitter adds a pad which is a function of the last NORST, and the receiver can check if it is "okay" (synchronized)or not (by comparing the pad he has received to the pad he produced in the same way). The receiver then transmits another pad back to the transmitter (which is another function of the last NORST) and the transmitter can check if they are "okay".

B. Medium Acknowledgement Process

The receiver decides, by his own means, if it is synchronized or not, and then transmits back to the transmitter a pad, which is left to the decision of the transmitter.

C. Weakened Acknowledgment

The receiver decides, according to his own means, and transmits back to the transmitter his decision "okay" or "not okay".

D. No Acknowledgment At All

The receiver alone decides by his own means.

Synchronization/Non-Synchronization

Both sides must quickly recognize if they are synchronized or not. Synchronization indicates identity in the state of the normal state machines (NORST) and throughout the process, and in the random input bits (R) that change NORST. A number of options are available also for this purpose. Following are several examples:

A. If the receiver gets a message that does not "make sense", this indicates that the two sides are out of synchronization. In this case, the one that received the message will activate a button that will inform the "machine" that there is "no synchronization".

B. Using extra bits in the plaintext message (X), which are used for indication of errors in the transmission. This scheme is used for short strings of bits (for example parity bits for every 8 data bits) which in the event of a lack of synchronization, the receiver will recognize automatically that the amount of error indications is increasing statistically toward 50%, as no equal NORST exists in either parties.

C. If Ri and redundant bits RDi (in segment i) contain elements dependent upon specific NORSTi (for example their places in the segment and/or their "meaning"), regardless of their randomness, then the receiver, if out of synchronization, gets these bits that appear in an illegal appearance by statistics, and thereby understands that they are out of synchronization.

D. According to the pads described above, prior to communication and/or following, for the receiver and/or for the transmitter.

SOME VARIATIONS

Random Changes in EMGST, and Activation EMGST

In this process, which is done in the "shadow", parallel to good "Normal" communications, EMGST is changed randomly by and in accordance with random bits RE, and any "emergency" activation of EMGST to begin communication, the process stops and is renewed again in the preceding normal good communications.

In between each change of EMGST there are many normal (and successful) communications. Thus, there is absolute assurance in these RE bits, which are collected and gathered in the beginning of each a round. Also, there is assurance in the specific EMGST, which is in memory, due to many normal communications between changes.

A question of uncertainty still remains in areas near the changing points. In activating EMGST, if there is a time lag between the two parties and in their counting, and one has crossed this point and the other has not, the first one has the new EMGST and the second one has the old one—Grey Areas. In order to solve this problem and similar problems, there are two general alternative processes with additional nuances. The first was described above as the "4 zone process"; the second is illustrated by the following two options:

The Rigid Trivial Process

In this process "good" normal communications are counted from the beginning (the first communication) up to the number N2. At the end of the number N2 of "good" communications, a new EMGST is created by the old EMGST and RE, the latter having been collected at the beginning of the process. The new EMGST enters memory, and the old EMGST goes down a level in memory, comparable to a stack, so that in memory, there exists:

NEW EMGST (hereinafter called $EMGST_2$), and OLD EMGST (hereinafter called $EMGST_1$).

The process is initialized again, and another number $N_2$ of "good" normal communications are counted. New random bits RE are generated at the beginning of this round. At the end of this round—number $N_2$—a fresh new EMGST is created, that is $EMGST_3$. $EMGST_3$ enters the stack in an upward manner and all of the others go down a level. The stack is now:

$EMGST_3$
$EMGST_2$
$EMGST_1$ and so on. The stack is full at all times and its magnitude is fixed: for example, for 5 levels:

$EMGST_5$
$EMGST_4$
$EMGST_3$
$EMGST_2$
$EMGST_1$

Each new incoming EMGST is placed on the upper level and all of the others go down a level, while the lowest one leaves both the stack and memory.

In the event of an "emergency" in which it is necessary to use EMGST as a seed to produce NORST for initializing communication, the transmitter initially chooses the EMGST of the uppermost level.

There are two possible nuances for the receiver:

Nuance a) If there is a handshake process containing pad assurances, then the receiver checks the pad according to all EMGSTs existing in its stack, starting at the uppermost level, and moving downwards. If there is a match, this EMGST will be activated for the communication.

Once "good" and "normal" communications are established, and after $M_2$ messages of such "good" communication, the receiver knows that the EMGST which was used was the correct one. Furthermore, this EMGST is pushed up (if it is not on the top level already) the stack, and those that preceded this EMGST will be pushed up along with it.

In the event that no EMGST in the stack matches the pad, the receiver gives a "handshake" to the transmitter, "no good" and the transmitter then goes down one level to the next EMGST and sends its pad and so on. The receiver checks all its EMGST in the stack etc. Now, if one passed the crossing point and the other has not, this process assumes that they will be synchronized very quickly.

After activating an "emergency" communication, the shadow process resumes and another good normal communication is counted up to $N_2$, where a new EMGST is created and enters the top level of the stack, etc.

Nuance b) If there is no "strong handshake" process, and no pad, then the agreement between the parties, in the case of an "emergency" state, will be such that if such communication was transmitted well or not, the receiver checks the communication "in parallel" through all of the EMGSTS in its stack, and checks which one is deciphered best. At the end of the communication, the receiver gives a special acknowledgment whether the communication "was good" or "was not good". If the transmitter received the "was not good" message, it tries the EMGST one level below the EMGST previously tested.

In this nuance the check if "good" or not, is done via the communication and not on a pad at the beginning. The check of the communication is done "in parallel" while receiving and deciphering.

There is no need to have all EMGSTS in the memory, as the lowest level remains in memory and the RE's are known for each level climbed.

The Adaptive Trivial Process

This process is similar to the previous process and with regard to its nuances, but with a few variations. For instance, if there is no "emergency" activation for a long period of time, for example 5 N2 communications, then a forced activation takes place in order to make sure that the stacks between the two parties are synchronized. The EMGST activated will be on the upper level of the stack at the end of the forced activation process (after M2 more normal communication) for both parties. In such a process there are two nuances: a) the periods are fixed, that is, $N_2$ is fixed and forced activation (if no inherent activation) after $h \cdot N_2$ communication where h is fixed. Nuance b): From one round to the other, if no inherent activation of EMGST occurred, $N_2$ is changed by a factor—lets say factor 2, so first round $N_2$, second round $2 \cdot N_2$, third $4 \cdot N_2$ etc., up to upper limit, and on the other hand if many occurrence of inherent activation, $N_2$ goes by factor of fractions, lets say ½ so first round $N_2$, second ½ $N_2$ and so on up to lower limit, lets say 15 communications per round.

This nuance is adaptive to the level of noise and problems in the channel and the same for forced activating of Emergency can be an adaptive one.

Assurance of Synchronization Between Parties about RE

Option A—Strong Ping Pong Process

The counting of communications numbers in the process of changing EMGST, will be in a ping pong manner, which means that only the change of direction of communication is counted, for example, after A is transmitted to B, then the counter goes up only when B will transmit to A, etc.

The process begins in the first communication. At this stage one party is the transmitter, the other is the receiver (for example, A is the transmitter and B the receiver). It is in the first communication that RE, the Random input for changing EMGST is generated. The transmitter (A), will surely get RE correctly. The receiver (B), can get RE incorrectly. In the second counted communication B is the transmitter according to the ping pong principle, B transmits back to A, the RE (within the information) it received initially in the first communication. In the third counted communication, A, as the transmitter, adds RE again to this communication. In the fourth counted communication, B, as the transmitter, adds RE, it received in the third communication and so on.

In such a process, there is:

1) A multiple of RE's being sent from the sure party (A) to the other party (B) so that this party will receive a large percentage of good RE's.

2) The sure party (A) can control the process by examining what it receives in return, and after many communications (but less than $N_2$) can decide if the other party received the information well, or not and then may stop the process by activating an emergency mode of communication—that, as we know, stops the process and is initialized again. The bottom line in this process is that there are two elements of assurance.

Option B—Weaker Ping Pong Process

The same as in option A but without element 2, because $N_2$ is a "big" number so the receiver (of the first communication) gets for sure a majority multiple of good RE and if something wrong occurs, it will stop because of out of synchronization in the normal communication.

Option C—The Inherent Process

If RE is the first $R_i$ in the first counted communication or the first few communications, and if the other party received it wrong, then they would be out of synchronization in the normal process of communications (due to an incorrect Ri) far before reaching communication $N_2$ ($N_2$ is a comparably "large" number). This option is the preferred option described above.

Combinations (Comb) For Cases of Activating Emergency

Option A—Random Combinations

Any time the Emergency mode is activated using EMGST to generate NORST for initializing communication, it will be coupled with "comb", which in this case is randomly chosen, and this number (comb) will be transported to the other party before the start of communication.

Option B—Combinations in an Ordered Pattern of Usage

Each party will have an ordered pattern of comb for its use as a transmitter and will know the pattern of the other party. The patterns will go in a cyclical manner, and in the case of activation, the number will be transported from one side to the other, this will be the case even without such transportion because the other party knows where in the pattern it is, and both parties know with certainty the comb being used.

Magnitudes of Parameters and Variables

Let us define $|r|$=length in bits of r, than if $|EMGST|>|NORST|>|K_E|\ |K_D|$ then there can be an inherent effect of negating the ability to know from the shorter variable the longer one, so that an eavesdropper that may know $K_E$ and/or $K_D$ will not be able to know NORST and from this, EMGST.

Functions

If generating functions, such as $f_{NS}$, $f_{EMG}$, $f_K$, $f_{COMB}$, etc., depending upon the specific configuration, are of one way nature, more ambiguity is added to the system, and therefore difficulty and uncertainty to break the system.

Dynamism a) If each NORST is playing part for a segment of X whose length in bits is shorter or equal to the length of segment key ($K_E$ and $K_D$), the effect of one time pad encryption can be realized and one can plan many types of systems and provide many levels of strength, by the comparable magnitudes $|K_E|$ and $|K_D|$ versus $|X_i|$.

b) If the length of $X_i$ is variable and is different from one segment depending upon specific segment's $NORST_i$ more uncertainty with respect to eavesdroppers can be achieved.

c) If locations and/or values of $R_i$ and $RD_i$ bits will be a function of NORSTi, still more uncertainty with respect to eavesdroppers can be achieved.

d) The same as c) for RE bits and dependence upon EMGST and/or NORST where they occur.

e) If the number of Ri bits and/or RDi bits and/or RE bits are a function of NORST and EMGST (for RE) even still more uncertainty with respect to eavesdroppers can be achieved.

Source of Random Bits $R_i$ (and RE)

Sources of Random Bits $R_i$ (and/or RE) can be of two general types:

a) From an independent random source at the transmission site, independent of encryption, communication, and information; for example an independent diode at the transmission site and then all bits, in this case $R_i$ and RD, are transmitted with the communication and can be transmitted on the same channel within bits of X and/or Y, or on a separate channel.

b) Ri can be chosen from the many bits of information—x and/or y, and then only RD bits are separately transmitted whereas $R_i$ bits are part of the communication itself. RD bits can be transported as added bits to x and/or y or on a separate channel. In the above-described preferred embodiment, this type (b) was used wherein the random bits Ri are taken from the ciphertext Y, and the redundant bits RD are added to the ciphertext.

Production

One can use the last few segments, instead of one, responsible for new segment parameters (for example: $NORST_1+NORST_2+ \ldots +NORST_{i+1}$, $R_1+R_2+ \ldots +R_i$) to produce $NORST_{i+1}$ in a deterministic and/or random manner—once only last segment, the other segments 1 and 3, are producing for segment 4, and many schemes are available depending upon $R_i$ or $NORST_i$ etc., so as the collecting and meaning of random bits and the production of elements are not in a FIXED manner but can appear in a random manner. Forced Activation: One may use a forced activation of "Emergency", if the time (not communications) has passed some limit, and no random change of EMGST occurred—for the reason that there will not be anything for a long time.

Many other variations and applications of the invention will be apparent.

What is claimed is:

1. A method of transmitting encrypted messages between two units, including initializing the two units with respect to each other, and thereafter transmitting the messages between the two units encrypted by means of dynamic random keys which are changed internally within the two units in synchronism with each other;

wherein one unit, serving as the transmitter party for a message, divides the message into a plurality of segments, encrypts each segment by an encrypting key which changes randomly from segment to segment, and transmits the encrypted segments;

wherein the other unit, serving as the receiver party for the respective message, receives the encrypted segments, divides each received message into the same segments as the transmitter, and decrypts each segment by the use of a decrypting key which initially matches the encrypting key and which changes randomly from segment to segment in the same manner as the encrypting key;

wherein the encrypting key is the output of a state machine at the transmitter, which state machine changes its state in a random manner from segment to segment according to at least one random manner from segment to segment according to at least one random characteristic transmitted with the respective segment;

and wherein the decrpting key is the output of a state machine at the receiver, which latter state machine also changes its state in a random manner from segment to segment according to the same random characteristic of the respective segment.

2. The method according to claim 1, wherein:

one unit, serving as the transmitter party for a message, divides the message into a plurality of segments, encrypts each segment by an encrypting key which changes randomly from segment to segment, and transmits the encrypted segments;

and the other unit, serving as the receive party for the respective message, receives the encrypted segments, divides each received message into the same segments as the transmitter, and decrypts each segment by the use of a decrypting key which initially matches the encrypting key and which changes randomly from segment to segment in the same manner as the encrypting key.

3. The method according to claim 2, wherein:

the encrypting key is the output of a state machine at the transmitter, which state machine changes its state in a random manner form segment to segment according to at least one random characteristic transmitted with the respective segment;

and the decrypting key is the output of a state machine at the receiver, which latter state machine also changes its state in a random manner from segment to segment according to the same random characteristic of the respective segment.

4. The method according to claim 1, wherein:

said segments are in the form of digital data in the binary notation;

and the state machines of the two parties change their states according to a function of at least one random bit in the respective segment.

5. The method according to claim 1, wherein the state machines of the two parties change their states according to a function of at least one random bit in the respective transmitted encrypted segment.

6. The method according to claim 1, wherein said at least one random bit is the value of the bit at the location specified by the state of said state machines.

7. The method according to claim 1, wherein the state machines of the two parties change their states according to a function of two random bits in the respective segment.

8. The method according to claim 1, including the further step of utilizing a function of the state of the respective state machine for determining the location of at least one random bit in the respective segment.

9. The method according to claim 1, including the further step of utilizing a function of the state of the respective state machine for determining the length of the respective segment.

10. The method according to claim 1, including the further steps of:

interjecting at least one redundant bit into each segment;

and utilizing said interjected redundant bits for detecting and/or correcting transmission errors.

11. The method according to claim 10, including the further step of utilizing a function of the state of the respective state machine for determining the locations of the interjected redundant bits in the respective segment.

12. The method according to claim 10, wherein a plurality of redundant bits are interjected into each segment.

13. The method according to claim 10, wherein the state machines of the two parties change their states according to two random bits in the respective segment, and six redundant bits are interjected into the respective segment for detecting and correcting up to two transmission errors in said bits.

14. The method according to claim 1, wherein:

said state machines are normal state machines effective during normal message transmissions to produce said random encrypting key and decrypting key;

each unit includes an emergency state machine;

the states of the emergency state machines in the two units are both changed together in a random manner during the transmissions of messages;

and in the event of detection of a difference in the states of the normal state machines of the two parties, an emergency condition is determined to have occurred, whereupon an emergency message is transmitted by one of the parties causing the current state of the emergency state machines at the transmitter and receiver to be utilized for changing the normal state machines at the transmitter and receiver to the same new normal state.

15. The method according to claim 14, wherein a message counter is incremented at each unit to count the number of normal message transmissions between the two units; each emergency state machine is changed in the same random manner by its respective messsage counter after counting a predetermined number of normal message transmissions to define a round of messages; and during each round of messages, random emergency bits are utilized for creating a new state in the emergency state machines of both units.

16. The method according to claim 15, wherein said random emergency bits are taken from one or more predetermined messages in the respective round of messages.

17. The method according to claim 16, wherein said predetermined message is the first message in the respective round of messages.

18. The method according to claim 15, wherein:

the occurrence of an emergency condition within a round restarts the counting of messages for the respective round;

and said random emergency bits are utilized for creating a new state in said emergency state machines only after a predetemined number of normal message transmissions in the respective round without the occurrence of an emergency condition.

19. The method according to claim 18, wherein:

each emergency message transmission includes a header announcing whether the Old state or a New state of the emergency state machine is to be used;

and in case an emergency condition occurs in a prescribed ambiguity region in the proximity of the end of the respective round, the receiver party uses the Old state or the New state, as included in the header of the emergency message transmission.

20. The method according to claim 19, wherein the transmitter and receiver each includes registers for registering any one of four zones, zone 1 identifying a beginning non-ambiguity region, zone 2 identifying a beginning ambiguity region, zone 3 identifying an ending ambiguity region, and zone 4 identifying an ending non-ambiguity region;

the occurrence of an emergency condition in zone 1 causing both parties to use the Old state of the emergency state machine;

the occurrence of an emergency condition in zone 4 causing both parties to use the New state of the emergency state machine;

and the occurrence of an emergency condition in either of zones 2 or 3 causing the receiver of the respective message to use the Old or New state, as announced in the header of the respective message transmission; but when using the Old state, the New state can be produced; and when using the New state, the Old state remains stored and the New state is produced at hoc, so that such states will be available in case the respective unit has to return to the Old state or resume the New state in order to maintain synchronism.

21. The method according to claim 20, including the further steps of:

setting a flag in the respective unit when an emergency condition occurs;

resetting the flag after a predetermined number $M_2$ of normal message transmissions have taken place between the two parties;

but if an emergency condition occurs while the respective party is in ambiguity zone 2 or 3, the respective unit utilizes the combination of the zone number, and the Old or New state of the respective emergency state machine used, to determine whether to return to the Old state, or use the New state and erase the Old state.

22. The method according to claim 21, wherein, upon the occurrence of an emergency condition the respective party:

(a) if in zone 2, and the Old state was used, returns to zone 1 after $M_2$ normal message transmission;

(b) if in zone 2, and the New state was used, moves to zone 3 after a predetermined number $M_1$ of normal message transmissions, wherein $M_1$ is less than $M_2$;

(c) if in zone 3, and the Old state was used, moves to zone 2 after a predetermined number $M_1$ of normal message transmissions;

(d) and if in zone 3, and the New state was used, moves to zone 4 after $M_2$ normal message transmissions.

23. Apparatus for transmitting encrypted messages between two nits, one unit including an encrypting system for encrypting messages, and a transmitter for transmitting the encrypted messages, and the other unit including a received for receiving the encrypted messages, and a decrypting system for decrypting the received messages;

said encrypting system in the transmitter, and decrypting system in the receiver utilizing dynamic random keys which are changed internally within the two units in synchronism with each other;

said one unit, serving as the transmitter, comprising means for dividing each message into a plurality of segments, means for encrypting each segment by an encrypting key which changes randomly from segment to segment, and means for transmitting the encrypted segments;

said other unit, serving as the receiver, comprising means for receiving the encrypted messages, means for dividing the messages into the same segments as in the transmitter, and means for decrypting each segment by the use of a decrypting key which initially matches the encrypting key and which changes randomly from segment to segment in the same manner as the encrypting key;

said encrypting key being the output of a state machine at the transmitter, which state machine changes its state in a random manner from segment to segment according to at least one random characteristic transmitted with the respective segment;

said decrypting key being the output of a state machine at the receiver, which latter state machine also changes its state in a random manner from segment to segment according to the same at least one random characteristic of the respective segment.

24. The apparatus according to claim 23;

wherein said one unit, serving as the transmitter, comprises means for dividing each message into a plurality of segments, means for encrypting each segment by an encrypting key which changes randomly from segment to segment, and means for transmitting the encrypted segments;

and wherein said other unit, serving as the receiver, comprises means for receiving the encrypted messages, means for dividing the messages into the same segments as in the transmitter, and means for decrypting each segment by the use of a decrypting key which initially matches the encrypting key and which changes randomly from segment to segment in the same manner as the encrypting key.

25. The apparatus according to claim 24, wherein:

the encrypting key is the output of a state machine at the transmitter, which state machine changes its state in a random manner from segment to segment according to at least one random characteristic transmitted with the respective segment;

and the decrypting key is the output of a state machine at the receiver, which latter state machine also changes its state in a random manner from segment to segment according to the same at least one random characteristic of the respective segment.

26. The apparatus according to claim 23, wherein:
said segments are in the form of digital data in the binary notation;
and the state machines at the transmitter and receiver change their states according to a function of at least one random bit in the respective segment.

27. The apparatus according to claim 26, wherein the state machines at the transmitter and receiver change their states according to a function of at least one random bit in the respective transmitted encrypted segment.

28. The apparatus according to claim 26, wherein said at least one random bit is the value of the bit at the location specified by the state of said state machines.

29. The apparatus according to claim 26, wherein the state machines at the transmitter and receiver change their states according to a function of two random bits in the respective segment.

30. The apparatus according to claim 23, including means utilizing a function of the state of the respective state machine for determining the location of at least one random bit in the respective segment.

31. The apparatus according to claim 23, including means utilizing a function of the state of the respective state machine when transmitting one segment for determining the length of the respective segment.

32. The apparatus according to claim 25, further including:
interjecting means for interjecting at least one redundant bit into each segment;
and means utilizing said interjected redundant bit for detecting and/or correcting transmission errors.

33. The apparatus according to claim 32, further including means utilizing a function of the state of the respective state machine for determining the locations of the interjected redundant bits in the respective segment.

34. The apparatus according to claim 32, wherein said interjecting means interjects a plurality of redundant bits into each segment.

35. The apparatus according to claim 32, wherein the state machines at the transmitter and at the receiver change their states according to two random bits in the respective segment, and six redundant bits are interjected into the respective segment for detecting and correcting up to two transmission errors in said bits.

36. The apparatus according to claim 23, wherein:
said state machines at the transmitter and receiver are normal state machines effective during normal message transmissions to produce said random encrypting key and decrypting key;
and wherein said transmitter and receiver each includes:
an emergency state machine whose states are both changed together in a random manner during the transmissions of messages;
means for detecting a difference in the states of the normal state machines at the transmitter and receiver, and for determining an emergency condition to have occurred in the event of such detection;
and means effective, upon the determination of such emergency condition, for actuating the transmitter to transmit an emergency message causing the current state of the emergency state machines at the transmitter and receiver to be utilized for changing the normal state machines at the transmitter and receiver to the same new normal state.

37. The apparatus according to claim 36, further including:
a message counter at the transmitter and receiver;
means for incrementing the message counter to count the number of normal message transmissions between the two parties;
means for causing each emergency state machine to be changed in the same random manner by said messsage counter after counting a predetermined number of normal message transmissions to define a round of messages; and utilizing means effective after each round of messages for utilizing random emergency bits for creating a new state in said emergency state machines both at the transmitter and at the receiver.

38. The apparatus according to claim 37, wherein said utilizing means takes said random emergency bits from one or more predetermined messages in the respective round of messages.

39. The apparatus according to claim 38, wherein said predetermined message is the first message in the respective round of messages.

40. The apparatus according to claim 37, wherein each of said message counters is effective, upon the occurrence of an emergency condition within a round, to restart the counting of messages for the respective round;
and said utilizing means utilizes said random emergency bits for creating a new state in said emergency state machines only after a predetemined number of normal message transmissions in the respective round have occurred without the occurrence of an emergency condition.

41. The apparatus according to claim 40, wherein:
the transmitter includes means for producing in each emergency message transmission a header announcing whether the Old state or a New state of the emergency state machine is to be used;
and the receiver includes means, effective when an emergency condition occuring in a prescribed ambiguity region in the proximity of the end of the respective round, to use the Old state or the New state, as included in the header of the emergency message transmission.

42. The apparatus according to claim 41,
wherein the transmitter and receiver each includes registers for registering any one of four zones, zone 1 identifying a beginning non-ambiguity region, zone 2 identifying a beginning ambiguity region, zone 3 identifying an ending ambiguity region, and zone 4 identifying an ending non-ambiguity region;
and wherein the receiver includes means, effective:
upon the occurrence of an emergency condition in zone 1, to cause the receiver to use the Old state of the emergency state machine;
upon the occurrence of an emergency condition in zone 4, to cause the receiver to use the New state of the emergency state machine;
and upon the occurrence of an emergency condition in either of zones 2 or 3, to cause the receiver to use the Old or New state, as announced in the header of the emergency message transmission; but when using the Old state, the New state can be produced; and when using the New state, the Old state remains stored and the New state is produced at hoc, so that such states will be available in case the respective unit has to return to the Old state or resume the New state in order to maintain synchronism.

43. The apparatus according to claim 42, further including:

a flag in the transmitter and receiver;

means for setting said flag when an emergency condition occurs, and for resetting the flag after a predetermined number $M_2$ of normal message transmissions have taken place between the parties;

and means effective, upon the occurrence of an emergency condition while a respective party is in ambiguous zone 2 or 3, for utilizing the combination of the zone number, and the Old or New state of the respective emergency state machine used, to determine whether to return to the Old state, or to use the New state and erase the Old state.

44. The apparatus according to claim 43, wherein said latter means is effective upon the occurrence of an emergency condition in the respective party:

(a) if in zone 2, and the Old state was used, to return to zone 1 after $M_2$ normal message transmission;

(b) if in zone 2, and the New state was used, to move to zone 3 after a predetermined number $M_1$ of normal message transmissions, wherein $M_1$ is less than $M_2$;

(c) if in zone 3, and the Old state was used, to move to zone 2 after a predetermined number $M_1$ of normal message transmissions;

(d) and if in zone 3, and the new state was used, to move to zone 4 after $M_2$ normal message transmissions.

45. The apparatus according to claim 23, wherein each unit includes both a transmitter and a receiver and is capable of serving as a transmitter for transmitting and encrypting a message, and also as a receiver for receiving and decrypting a message.

46. The apparatus according to claim 45, wherein each unit also includes a state machine and a memory for each party with which it may communicate.

47. The apparatus according to claim 23, wherein each unit includes both a transmitter and receiver, a normal state machine and a memory for each party with which it may communicate, and an emergency state machine and a memory for each party with which it may communicate.

* * * * *